INVENTORS
RUSSELL E. HUKEE
LAURENCE H. DUNKLEE

INVENTORS
RUSSELL E. HUKEE
LAURENCE H. DUNKLEE
BY
AGENT

United States Patent Office 3,051,815
Patented Aug. 28, 1962

3,051,815
PHASE CONTROLLED SERVO SYSTEM
Russell E. Hukee, Santa Ana, and Laurence H. Dunklee,
Garden Grove, Calif., assignors to North American
Aviation, Inc.
Filed Sept. 30, 1959, Ser. No. 843,488
9 Claims. (Cl. 219—20)

This invention relates to an automatic control system and more particularly, in a specific embodiment, to a phase controlled servo system for automatically controlling temperature.

Electronic components in today's missiles and aircraft often have operating characteristics which are critical at times so as to demand precision temperature control. For example, in a highly accurate auto-navigator system there is required a reference time measurement signal. This signal is generated by a precision electronic clock device. The electronic components in the clock are of such a precise nature that temperature control to within ±0.1 degree centigrade is required at all times.

Temperature control systems of the prior art are severely limited to the degree of temperature control provided. A typical temperature control system often utilized is an automatically controlled servo system in which a servo loop has a detecting device to detect changes in temperature, with the servo regulating the amount of current supplied to an oven heater in accordance with the changes in temperature. The precision to which the oven temperature can be controlled will depend chiefly on the overall loop gain in the servo loop. Because of the comparatively long thermal time constant between the oven heater at the output of the servo and the temperature detecting device at the input of the servo, the loop gain is limited thereby limiting the precision to which the oven temperature can be controlled. Additionally, the long thermal time constant between the input and output of the servo system causes the servo loop to oscillate, further limiting the control of the temperature level. Other temperature control systems of the prior art similarly are limited in the amount of control.

The device of this invention overcomes the inherent disadvantages in prior automatic servo temperature control systems and operates to maintain the temperature of a material in an oven at a predetermined precision constant level. A high gain servo system (which, of course, may be applicable to other servo loop applications wherein a sensor (error, position, or distance) "feeds back" a signal to which the servo system must respond) is provided wherein precision control is generated by means of a phase controlling system in cooperation with the servo loop. Stability and precision are provided by the accomplishment of a short thermal time constant between the oven heater and the temperature detecting bridge. A short thermal time constant is generated by means of a system for amplifying greatly the changes in temperature and phase modulating a current supply means in accordance with the changes in temperature. Further stability and precision is provided by a feedback lead from the output of the servo loop to the input of the detecting means which anticipates changes in temperature in the oven.

It is therefore an object of this invention to provide an improved automatic temperature control system.

It is another object of this invention to provide a phase modulated servo system for automatic control.

It is a further object of this invention to provide a servo system for automatically controlling the temperature of a material in accordance with the difference in phase between the temperature changed signal and the source.

It is a still further object of this invention to provide a phase controlled servo system of high gain for automatically controlling the temperature of a material.

It is still another object of this invention to provide a servo system for automatically controlling the temperature of a material in which a single alternating-current source is utilized in the control system.

It is a further object of this invention to provide a transistorized high gain servo system for automatically controlling the temperature of a material in which an alternating-current source supplies a current to a heating element and which a reference signal of predetermined phase relationship with the alternating-current source provides precision control of the current supply means.

Other objects of invention will become apparent from the following description taken in connection with the accompanying drawings in which.

Figure 1:
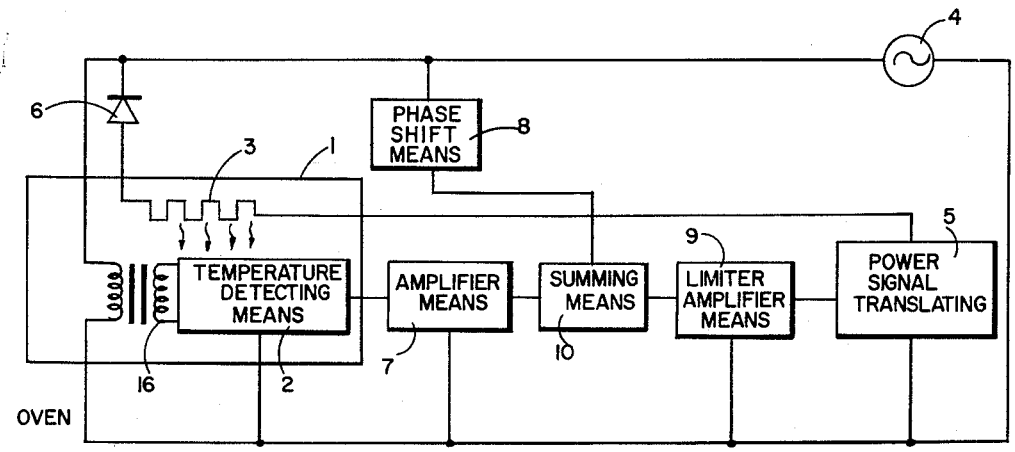
FIG. 1 is a block diagram illustrating the principal features of the invention.

Referring to FIG. 1, a block diagram illustrating the principal features of the invention, a precision electronic element or system may be enclosed in a suitable oven 1 to be controlled in temperature. Temperature detecting means 2 provides a continuous indication of the temperature in oven 1. Oven 1 is heated by heater 3 which is supplied with energy from A.-C. source 4 through power signal translating means 5 and rectifier means 6. Energy is supplied to heater 3 from source 4 during a predetermined portion of each cycle of operation. Rectifier means 6 may be connected so that heater 3 is supplied with energy from A.-C. source 4 during alternate half cycles of operation. Temperature detecting means 2 continuously measures the temperature in oven 1 and provides an output signal to amplifier means 7 whose polarity is indicative of the sense of temperature change in oven 1 and whose amplitude is indicative of the amount of temperature change therein. Transformer 16 supplies an A.-C. reference signal to detecting means 2. Amplifier means 7 feeds a signal to summing means 10 which also receives at its input a reference signal from phase shift means 8 which is responsive to a portion of the signal from A.-C. source 4. Phase shift means 8 generates a reference signal which is out of phase with respect to the phase of said A.-C. source by a predetermined amount. The reference signal from phase shift means 8 and the signal from temperature detecting means 2 are combined in summing means 10 to produce a control signal differing in phase with respect to the phase of the reference signal in proportion to the amplitude of the output signal from temperature detecting means 2. The control signal from summing means 10 then is an A.-C. signal derived from the phase modulating of the reference signal from phase shift means 8 by the signal indicative of the amplitude and polarity of the temperature change in oven 1. The control signal from summing means 10 is coupled to limiter amplifier means 9 which converts the A.-C. signal to a square wave A.-C. signal and presents it to the input of power signal translating means 5. Signal translating means 5 acts as a switch supplying energy from A.-C. source 4 through rectifier means 6 to heater 3 for a portion of the alternate half cycles of operation of A.-C. source 4. The portion is determined by the square wave control signal presented to translating means 5 by the output of limiter amplifier means 9.

In operation temperature detecting means 2 is adjusted so that when the temperature in oven 1 is at the desired control point temperature the output of detecting means 2 will be zero. Phase shift means 8 is adjusted so that the reference signal presented to amplifier 7 and coupled to translating means 5 through limiter amplifier means 9 will cause signal translating means 5 to supply energy from A.-C. source 4 through rectifier means 6 to heater 3 for a predetermined portion of each alternate half cycle of operation. The adjustment may be, for example, such that the signal from phase shift means 8 lags in phase the signal from A.-C. source 4 by a predetermined amount, which may be, for example, 90 degrees. Combining the minus 90 degrees signal from phase shift means 8 with a zero signal from detecting means 2 in summing means 10 produces a control signal which is still 90 degrees lagging in phase from the signal of A.-C. source 4. This control signal, converted into a square wave signal by limiter amplifier means 9 and coupled to translating means 5, causes translating means 5 to supply energy to heater 3 for approximately one-half of the applied half cycle period. This provides the approximate heating power to the material in oven 1 to compensate for oven heat loss. Thus, the system is adjusted in the beginning so that the reference signal operates to control the supply of energy through translating means 5 for a portion of each half cycle of operation from A.-C. source 4 in order to maintain the temperature constant in oven 1.

Now assume, for example, that the temperature in oven 1 falls below the desired control point. This change in temperature is detected by temperature detecting means 2 which presents an output signal to amplifier means 7 which is in the same sense with respect to the signal from A.-C. source 4 and whose amplitude is proportional to the amount of decrease in temperature of oven 1. This signal is combined in summing means 10 with a reference signal from phase shift means which lags the signal from A.-C. source 4 by 90 degrees. The minus 90 degrees reference signal is modulated by the in-phase error signal producing a signal at the output of summing means 10 which is more nearly in phase with the A.-C. source 4 signal than the reference signal from phase shift means 8. In other words, whereas the reference signal from phase shift means 8 was lagging the A.-C. source signal by 90 degrees, the reference signal as phase modulated by the signal from temperature detecting means 2 produces a control signal at the output of summing means 10 which is out of phase with A.-C. source 4 somewhere between zero and 90 degrees, depending on the amplitude of the error signal from temperature detecting means 2. Limiter amplifier means 9 produces a square wave signal from the control signal, presenting a signal to translating means 5 which is more nearly in phase with A.-C. source 4 than the reference signal from phase shift means 8. Since the signal applied to translating means 5 is more in phase with the signal from A.-C. source 4 than the reference signal, translating means 5 is on for a greater portion than the portion of the alternate half cycles of operation was on with just the reference signal controlling the translating means. Energy is supplied to heater 3 for a greater portion of operation, therefore causing the temperature in oven 1 to rise toward the control point. When the temperature reaches the control point level, temperature detecting means 2 no longer presents an output signal to amplifier means 7 and the reference signal from phase shift means 8 again provides the entire control of the supply of energy through translating means 5, reducing the supply to one-half of each half cycle of operation, thereby maintaining the temperature at the control point level. Conversely, when the temperature in the oven rises above the control point, the signal from temperature detecting means 2 is 180 degrees out of phase with the A.-C. source signal applied to translating means 5. This 180 degrees out of phase error signal phase modulates the 90 degrees lagging reference signal, producing a control signal which is even more out of phase with the source signal than the reference signal, thereby causing translating means 5 to supply energy to heater 3 for a lesser portion than the portion provided by the control from the reference signal. Thus, translating means 5 is on for less than half of each half cycle of operation, thereby causing oven 1 to tend to drop in temperature toward the control point level.

Figure 2:
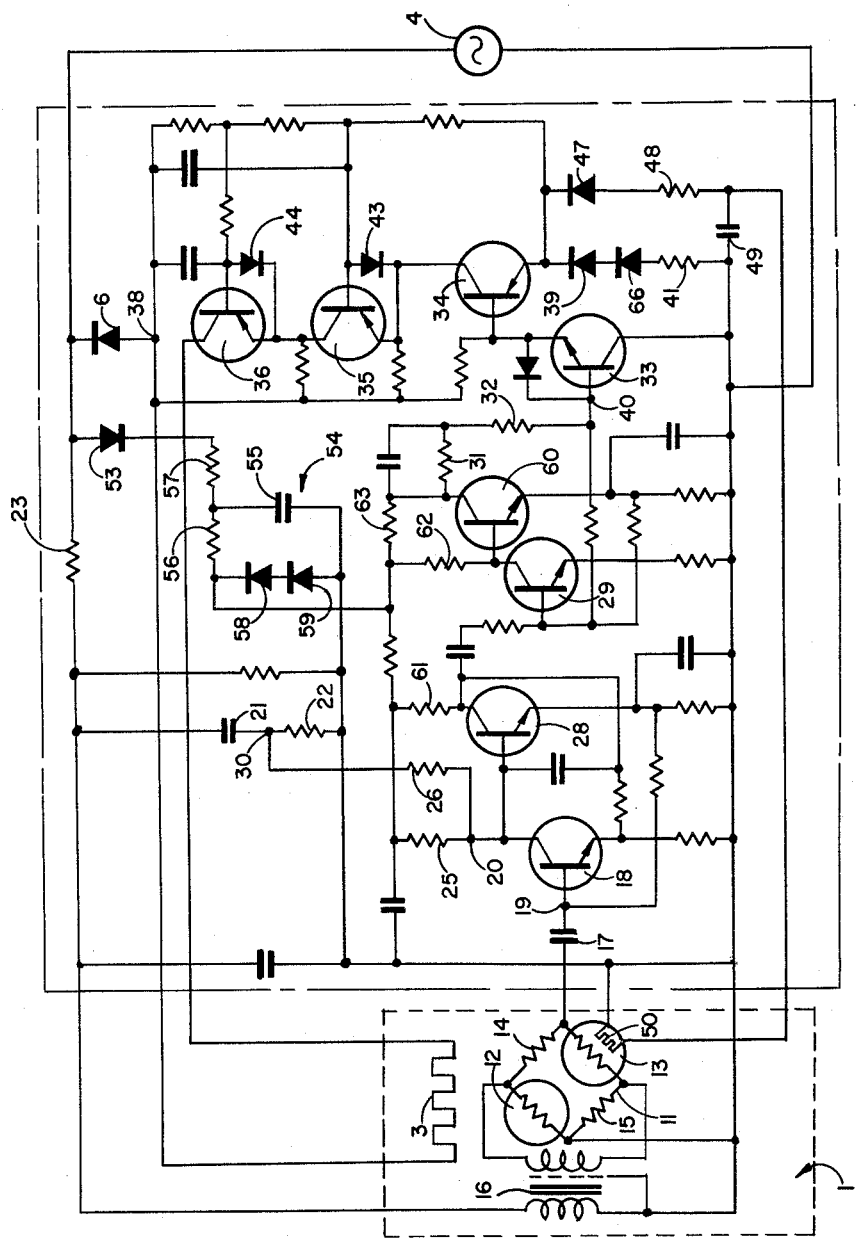
FIG. 2 is a schematic diagram of the preferred embodiment of the invention.

Turning now to FIG. 2 there is shown a schematic diagram illustrating the principal embodiment of the device of FIG. 1. Oven 1 has enclosed therein a material to be controlled in precision temperature. The means for detecting the temperature of the material comprise a bridge network 11 utilizing a Wheatstone bridge having thermistor elements 12 and 13 located in opposite legs of the bridge to detect the temperature of the material. Thermistors 12 and 13 have high temperature coefficients of resistances and detect minute changes of temperature in oven 1. Resistors 14 and 15 located at opposite legs of bridge network 11 have low temperature coefficient units. Bridge network 11 has a pair of input terminals connected to receive an alternating current driving voltage from transformer 16. The primary of transformer 16 is connected to receive its supply from A.-C. source 4 and the secondary is connected across the input terminals of the bridge network. Bridge network 11 has its pair of output terminals connected to provide an error signal indicative in phase of the sense of temperature changes in oven 1 and indicative in amplitude of the amount of temperature change. The error signal from bridge network 11 is coupled through capacitor 17 to the input of a control amplifier comprising NPN transistor 18. The error signal is amplified and phase inverted by transistor 18 with the inverted amplified output appearing at the collector of the transistor at point 20. Phase shift means 8, comprising capacitor 21 and resistor 22, has the upper plate of capacitor 21 connected through series limiting resistor 23 to one side of A.-C. source 4. One end of resistor 22 is connected to the other side of A.-C. source 4 and the midpoint 30 provides a reference signal which lags the source signal in phase by 90 degrees. The minus 90 degrees reference signal at point 30 is combined with the error signal through a summing network comprising resistors 25 and 26 to produce a signal at point 20 which represents the minus 90 degrees reference signal phase shifted by an amount proportional to the polarity and relative amplitude of the error signal at point 19, or, in other words, the reference signal produced at point 30 is phase modulated by the error signal at point 19 with the output phase modulated signal presented at point 20. The control signal at point 20 amplified by a Class A amplifier comprising transistor 28 with the control signal from point 20 coupled to the base of transistor 28 and the amplified output signal presented at the collector of the transistor. The collector output signal from transistor 28 is coupled to the input of limiter amplifying means 9 comprising NPN transistors 29 and 60 connected in tandem to receive the control signal at the base of transistor 29 and present amplified output signal at the collector of transistor 60. Transistors 29 and 60 combined have sufficient gain to develop a square wave output signal at the collector of transistor 60 for a minimum input signal received at the base of transistor 29. The square wave control signal at the collector of transistor 60 is connected through limiting resistors 31 and 32 to input point 40 of the driver amplifier comprising NPN transistor 33. Amplifier 33 has its output taken at its emitter coupled to the input of signal translating means 5 which comprises transistors 34, 35, and 36. Transistors 34, 35, and 36 of the PNP type have their output electrodes connected in series. The collector electrode of transistor 36 is connected to one side of heater 3 comprising a resistor heating element. The other side of heater 3 is connected to receive alternating current from A.-C. source 4. Rectifier 6, connected in series between A.-C. source 4 and heater 3, is poled to allow current to pass only on negative half cycles of operation from A.-C. source 4. The emitter of transistor 36 is connected to the collector of transistor 35 and the emitter of transistor 35 is connected to the collector of transistor 34. The emitter of transistor 34 is connected through diodes 39 and 40 and resistor 41 in series to the other side of A.-C. source 4. Thus, the output electrodes of transistors 34, 35, and 36 provide a series circuit between one side of heater 3 and one side of A.-C. source 4. The base of transistor 34 is connected to the emitter of transistor 33 with conduction in transistor 34 being controlled by the square wave control signal presented by transistor 33. Transistor 33 acts as an output switch driver amplifier controlling the base current of transistor 34 and the current through the emitter-collector circuit thereof. The collector of transistor 34 is connected through diode 43 to the base of transistor 35 and the collector of transistor 35 is connected through diode 44 to the base of transistor 36. Thus, transistors 34, 35 and 36 operate in series with the current through their outputs being controlled by the signal from transistor 33 presented at the base of transistor 34. A negative feedback loop between bridge 11 and the output of translating means 5 is provided by the circuit comprising diode 47 connected through a filter comprising resistor 48 and capacitor 49 to auxiliary heating element 50, the other side of element 50 being connected to the other side of A.-C. source 4. Auxiliary heater 50 receives a current from the emitter of transistor 34 which is proportional to the current flowing through the combined collector-emitter circuits of transistors 34, 35, and 36. Auxiliary heater 50 is in close thermal contacts with thermistor 13, and in the preferred embodiment may be embedded in the glass coating of thermistor 13.

In the embodiment of FIG. 2 A.-C. source 4 supplies all of the electrical power needed for the system. D.-C. operating power for the various transistors shown is provided by a rectifier and filter system. D.-C. power for transistors 18, 28, 29, and 60 is provided by the rectifier and filter network comprising rectifier 53 having one end connected to A.-C. source 4 and the other end connected through filter network 54 comprising capacitor 55, resistors 56 and 57, and diodes 58 and 59, to the collectors of transistors 18, 28, 29, and 60 through limiting resistors 61, 62, and 63. The emitters of transistors 18, 28, 29, and 60 are connected through respective resistors to the other side of A.-C. source 4. D.-C. supply for series transistors 34, 35, and 36 is provided by diode 38 which supplies current through the transistors to heater 3 on alternate negative half cycles of operation only.

In operation of the embodiment illustrated in FIG. 2 it will first of all be assumed that the temperature in oven 1 is exactly at the desired control point. Current is supplied to heating element 3 from A.-C. source 4 through signal translating means 5 and rectifier 6. Thus a current path is created through heating element 3 comprising one side of A.-C. source 4, resistor 41, diode 66, diode 39, the emitter-collector circuit of transistor 34, the emitter-collector circuit of transistor 35, the emitter-collector circuit of transistor 36, heater 3, diode 6, and the other side of A.-C. source 4. Diode 6 allows conduction therethrough only during negative half cycles of operation of A.-C. source 4. Phase shift means 8 presents a signal at point 30 which lags in phase by 90 degrees the signal from A.-C. source 4. This signal is combined with the signal from point 19 of the output of bridge network 11 to produce a phase modulated control signal at point 20. Since the temperature in oven 1 is at the desired control point level, the output of bridge 11 is zero and therefore the signal at point 20 is identical with the reference signal at point 30. Thus, a control signal amplified by transistor 28 and converted to a square wave signal by transistors 29 and 60 is presented to point 40 of the base of transistor 33, the control signal being exactly 90 degrees out of phase with respect to A.-C. source 4 or being in phase with the reference signal at point 30. This signal is further amplified by transistor 33 and presented to transistors 34, 35, and 36. Thus, transistors 34, 35, and 36 are controlled at their bases to allow conduction only during the portion of each half cycle of operation in which the signal at the output of transistor 33 is in phase with the signal from A.-C. source 4 to rectifier 6. Since the signal presented at the output electrodes of transistors 34, 35, and 36 by A.-C. source 4 through diode 6 is a signal representing negative half cycles of operation only, and since the control signal at the bases of transistors 34, 35, and 36 is a square wave signal lagging in phase by 90 degrees, the signal presented to the output electrodes, transistors 34, 35, and 36 are cut off during half the negative half cycle portion and are allowed to conduct only during the second half or 50 percent of the negative half cycle of operation. Thus, current is supplied to heating element 3 during 50 percent of the applied half cycle period. This provides the approximate heating power necessary to compensate for oven heat loss, thereby maintaining oven 1 at the desired control point. It is to be realized, of course, that phase shift means 8 may be adjusted by means well known in the art to provide a reference signal at any predetermined amount of phase difference with respect to the signal from A.-C. source 4 according to the particular design requirements of the oven being heated.

Assuming now that the temperature in oven 1 has dropped below the control point, temperature detecting bridge 11 presents an output signal at point 19 which is in phase with the signal from A.-C. source 4 and has an amplitude directly proportional to the temperature change in oven 1. The in-phase error signal at point 19 is amplified by transistor 18 and combined with the minus 90 degrees reference signal at point 30. The resulting control signal at point 20 represents the reference signal at point 30 shifted in phase or phase modulated by the signal at point 19 to present a signal at point 20 which is shifted in phase by an amount dependent on the relative amplitude of the error signal at point 19. Since the signal at point 19 was in phase with the signal at A.-C. source 4, the shift of phase is in a direction toward the phase of A.-C. source 4. Therefore, the signal at point 30 is more nearly in phase with the signal of A.-C. source 4 than the minus 90 degrees reference signal. The control signal, after being amplified by transistor 28, is converted into a square wave signal by transistors 29 and 60 and presented to point 40. The control signal at point 40 then is a square wave signal whose relationship in phase with a signal at A.-C. source 4 represents the minus 90 degrees phase shift of the reference signal at point 30, shifted to be more nearly in phase with the signal of A.-C. source 4 when combined with the error signal at the output of the bridge network. The output of driver amplifier 33 is coupled to the inputs of transistors 34, 35, and 36. Transistors 34, 35, and 36 will conduct during the portion of each half cycle of the signal from A.-C. source 4 presented to the output electrodes of transistors 34, 35, and 36 coincidentally with the portion of the half cycle of operation when the square wave control signal presented to the bases of transistors 34, 35, and 36 is in phase with the output signal presented to the output electrode. Therefore, current flows through the output electrodes of transistors 34, 35, and 36 for a greater portion of the negative half cycle of operation than when the reference signal at point 20 was controlling the operation since the signal applied at point 40 when the temperature is too low in oven 1 is more nearly in phase with the signal of A.-C. source 4 than the reference signal at point 20 was. This operation causes conduction through heater 3 for a greater portion of the half cycle of applied operation, therefore tending to cause oven 1 to rise in temperature.

Now assuming that the temperature in oven 1 rises above the control point, the error signal at point 19 is 180 degrees out of phase with the signal from A.-C. source 4. The combining of the minus 90 degrees reference signal of point 30 and the minus 180 degrees error signal at point 19 produces a signal at point 20 which is more nearly out of phase with the signal of A.-C. source 4 than the reference signal was. This signal, amplified and converted into a square wave, presents a signal at point 40 which is more out of phase with A.-C. source 4 than the minus 90 degrees reference signal was. Therefore, coincidence between the signal at the bases of transistors 34, 35, and 36 and the A.-C. source signal at their output electrodes occurs for a lesser portion of the half cycle of operation. Less current is supplied to heating element 3 and the temperature in oven 1 drops toward the control point.

Temperature stability of the oven is provided by amplifying the error signal at point 19 to a high degree, with transistors 18 and 28 having a high gain. In order to provide stability and precision control of the temperature in oven 1 the negative feedback loop from the emitter of transistor 34 through diode 47 and the filter comprising resistor 48 and capacitor 19 to auxiliary heater 50 shortens the time between the sensing of the temperature by bridge 11 and the compensation thereof by heating element 3. Auxiliary heater 50 receives a current from the emitter of transistor 34 which is proportional to the current being supplied by transistors 34, 35, and 36 to heating element 3. As the current is varied through auxiliary heater 50 in accordance with the current flowing through heater 3, thermistor 13 changes in resistance proportional thereto. Therefore, the resistance of thermistor 13 is dependent on the heat being supplied by auxiliary heater 50 as well as the temperature in oven heater 1. This auxiliary heat is directly proportional to the amount of current flowing through heating element 13. A small amount of auxiliary heat causes thermistor 13 to present a signal to the output of bridge network 11 which is not only indicative of the change in temperature in oven 1 but is also indicative of the amount of current being supplied to heater 3. Thus, a negative feedback network is provided between the output of the servo loop at translating means 5 and the input of the loop of bridge network 13 which is, in effect, the lead network and compensates for changes in temperature.

Figure 3:
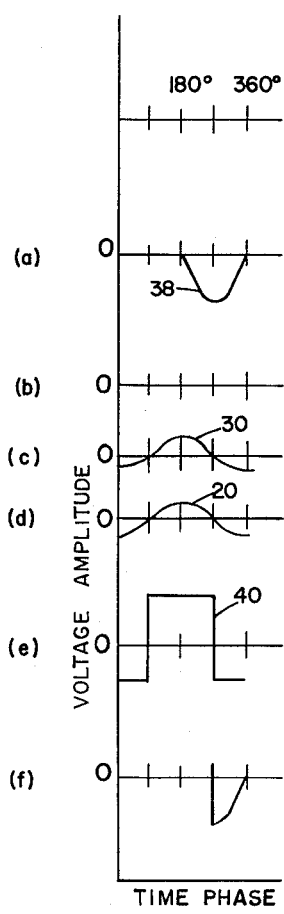
FIG. 3 is a diagram illustrating waveforms of points in the circuit of FIG. 2 when the temperature is at the desired level.
Figure 4:
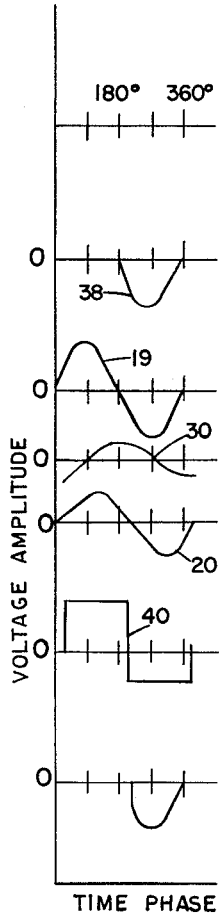
FIG. 4 illustrates waveforms when the temperature is below the desired level.
Figure 5:
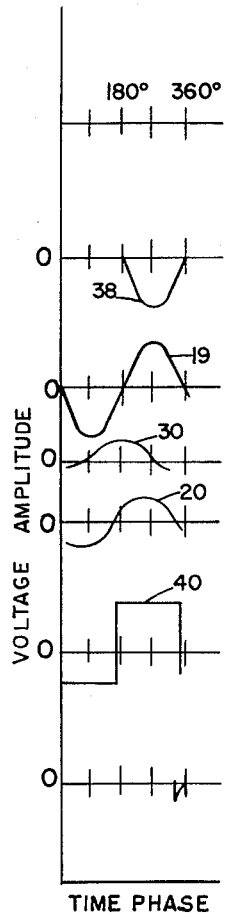
FIG. 5 illustrates waveforms when the temperature is above the desired level.

Turning now to FIGS. 3, 4, and 5, there is illustrated the waveforms of the various operating points of the circuit of FIG. 2. FIG. 3 represents the waveforms of the circuit in operation when the temperature of oven 1 is at the control point. FIG. 4 represents the waveforms of operation when the temperature of oven 1 is at a temperature below the control point. FIG. 5 represents the waveforms of the operation when the temperature in oven 1 is at a temperature above the control point. FIG. 3a represents the signal at point 38; FIG. 3b represents the bridge error signal at point 19; FIG. 3c represents the minus 90 degrees reference signal at point 30; FIG. 3d represents the phase shifted control signal at point 20; FIG. 3e represents the square wave control signal at point 40; and FIG. 3f represents the actual signal applied to heating element 3. In FIG. 3a current is supplied from A.-C. source 4 during negative half cycles of operation between 180 and 360 degrees. The error signal at point 19 (FIG. 3b) is zero. The reference signal at point 30 (FIG. 3c) lags by 90 degrees the signal at point 38 (FIG. 3a) and is of a predetermined set amplitude. Thus, as shown in FIG. 3d, the control signal at point 20 is exactly equal to the reference signal at point 30 (FIG. 3c) since the error signal at FIG. 3b is zero. This control signal is converted to a square wave signal at point 40 (FIG. 3e) which lags by 90 degrees the signal at point 38. The signal from point 38 and the signal from point 40 are combined at the transistors of signal translating means 5 to produce a signal across heating element 3 (FIG. 3f) which is 50 percent of the half wave portion of point 38 since the transistors of translating means 5 will conduct current only when the voltage at their bases goes negative, as noted by the trailing edge of the square waveform at point 40. Thus, current flows through the transistors of translating means 5 only during the portion of the half cycle of waveform 38 from 270 degrees to 360 degrees. This current flowing in heating element 3 is just enough to maintain the temperature at the desired control point.

In FIG. 4 the temperature of oven 1 has fallen below the control level and must be compensated for. FIGS. 4a through 4f represent the waveforms at the same points as illustrated in FIG. 3a. In FIG. 4, however, unlike FIG. 3, the output of bridge 11 at point 19 (4b) is a signal of maximum amplitude and in phase with the signal from point 38 (4a). The combination of the error signal at point 19 and the minus 90 degrees reference signal at point 30 (4c) produces a signal at point 20 (4d) which is almost in phase with the signal at point 38. The amplification factor of transistor 18 in FIG. 2 is such that when a maximum error signal is received at point 19 it is amplified to a high enough degree to almost completely overrule the reference signal at point 30 and produce a signal at point 20 which is almost in phase with the signal at point 38. The square wave signal at point 40 (4e) thus is almost in phase with the signal at point 38 and produces a waveform at FIG. 4f across heating element 3 which allows conduction through the transistors and supply of current to heating element 3 for almost all of the half cycle of operation.

The waveforms in FIG. 5 illustrate the operation of the circuit when temperature has risen to the maximum allowable amount over the control point. The error signal at point 19 (5b) is now a signal 180 degrees out of phase with the signal at point 38 (5a), indicating that the temperature is too high. Here again by reason of the amplification of transistor 18 in FIG. 2, the error signal is large enough to almost completely overcome the reference signal at point 30 (5c), producing a combined signal at point 20 (5d) which is almost 180 degrees out of phase with the signal at point 38. The square wave control signal at point 40 (5e) being almost 180 degrees out of phase with the signal at point 38 causes transistors 34, 35, and 36 of translating means 5 to be cut off during almost the entire cycle of operation, greatly reducing the heat supplied to heating element 3, therefore tending to reduce the temperature in oven 1.

Figure 6:
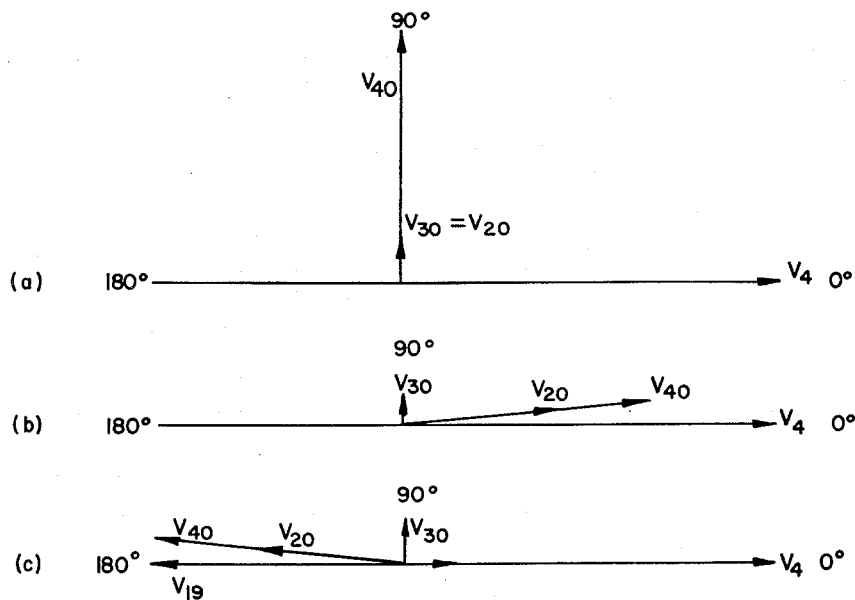
FIG. 6 illustrates by means of vector diagrams the phase relationship between the various operating points of the system.

Turning now to FIG. 6 there is illustrated in vector form the phase relationship of the various points of the circuit of the embodiment of FIG. 2. FIG. 6a represents the operation of the circuit for intermediate power output when the temperature of the oven is at the desired control point level. Vector $V_4$ represents the supply voltage of A.-C. source 4. Vector $V_{30}$, representing the minus 90 degrees reference signal, is 90 degrees out of phase with $V_4$. Since there is no error signal from the temperature detecting bridge, $V_{20}$, representing the combination of the reference signal and the error signal, is in phase with the reference signal $V_{30}$ and 90 degrees out of phase with the source voltage $V_4$. $V_{40}$, representing the square wave control signal, thus is 90 degrees out of phase with the source $V_4$, providing a flow of current through heating element 3 for 50 percent of the negative half cycle of operation. In FIG. 6b there is illustrated the vector diagrams when the circuit is operating with the temperature in oven 1 at the maximum low point. $V_{30}$, representing the reference signal, is still 90 degrees out of phase with $V_4$, the supply voltage. $V_{19}$, representing the error signal from the bridge detector, is exactly 180 degrees out of phase with $V_4$. The amplitude of $V_{19}$ being a maximum error signal is substantially greater than the amplitude of the reference signal $V_{30}$. Thus, $V_{20}$, representing the vector of the combination of the voltages $V_{30}$ and $V_{19}$, is almost in phase with the A.-C. source $V_4$. $V_{40}$ in phase with $V_{20}$ thus allows conduction through signal translating device 5 for almost all of the half cycle operation. In FIG. 6c there is illustrated the vector diagrams when the temperature in oven 1 is at the maximum allowable amount. In this case the error signal at $V_{19}$ is 180 degrees out of phase with $V_4$, the source voltage. The combination of the error signal $V_{19}$ with the reference vector $V_{30}$ produces a vector control $V_{20}$ and square wave control signal $V_{40}$ which is almost 180 degrees out of phase with the source $V_4$, thus allowing conduction through translating means 5 for a minimum amount of time, reducing the supply of energy to heating element 3 and causing the temperature in oven 1 to fall to the control point.

The temperature control servo system of this invention provides precision temperature control of oven 1 at any desired operating temperature. As illustrated in the preferred embodiment in FIG. 2, the control system operates to provide precision temperature control of materials in an oven 1. The control, as explained, is provided by means of phase controlling a reference signal to lower or raise the time of the supplying of energy to heating element 3 in accordance with an error signal from the bridge detecting network. This method of phase modulation may be applied to any type of power amplifier circuit where output waveforms are not important. For example, in servo amplifiers or D.-C. power supplies the phase control system of this device could readily be applied. The control system operates without thermostats, relays or other components which cause errors in previously known temperature control systems.

By utilizing a single source of A.-C. power a more simple control system may be provided, not needing any source of direct current. Further, by utilizing high voltage transistors in the translating means 5, the need for a power transformer is obviated. The only transformer needed is the transformer which supplied the reference alternating-current signal to bridge 11 in the temperature detecting network. Since the power required by this transformer is at a minimum, no power transformer is needed, resulting in a significant reduction in cost, weight, and volume. By utilizing three transistors in series for the means for translating power from A.-C. source 4 to the heating element and phase controlling one stage therein, the circuit may control five to ten times the nominal amount of power with the same transistors and with no greater dissipation in the output stage than for Class B operation.

The illustrated embodiment of this invention relates to the automatic servo control of temperature. The method of servo control illustrated may also be applied to any type of power amplifier circuitry such as servo amplifiers or D.-C. power supply circuits.

Although the invention has been described and illustrated in detail, it is to be clearly understood that the same is by way of illustration and examle only and is not to be taken by way of limitation, the spirit and scope of this invention being limited only by the terms of the appended claims.

We claim:

1. In a servo system for automatic control, an A.-C. source, a load, means for detecting the response of said load, said means for detecting being energized by said A.-C. source, phase shifting means connected to receive the output of said A.-C. source, phase inverting means connected to invert the output of said means for detecting the response, summing means connected to add the output of said phase shifting means and said phase inverting means thereby providing a phase modulated signal, limiting means for limiting the output of said summing means, phase sensitive switch means responsive to the limited output of said summing means, said switch means operative to connect said A.-C. source in circuit with said load.

2. In a servo system for automatically controlling the temperature of a material, means for heating said material, an A.-C. source, means for supplying energy to said heating means from said A.-C. source during a predetermined portion of each cycle of operation, means responsive to said A.-C. source for generating a reference signal, said reference signal shifted in phase with respect to said A.-C. source a predetermined amount, means for detecting changes in temperature of said material, means responsive to said detected changes for shifting the phase of said reference signal from said predetermined amount, means for amplifying said last mentioned means, and means responsive to said amplifying means for varying said predetermined portion of each cycle of operation.

3. In a servo system for automatically controlling the temperature of a material, a resistor element for heating said material, an A.-C. source, a signal translating device having a control electrode and a pair of output electrodes for supplying current from said source to said resistor element, means for limiting the supply of current from said source to half cycles of operation, means responsive to said A.-C. source for generating a reference signal shifted in phase with respect to said A.-C. source by a predetermined amount, means responsive to said reference signal connected to said control electrode to control the supply of current through said output electrodes, a resistance bridge circuit having a temperature sensitive element in one leg for detecting minute changes in temperature of said material, and means responsive to said changes in temperature for phase modulating said reference signal in proportion to the amplitude and polarity of said changes in temperature.

4. The combination recited in claim 3 wherein is included an auxiliary heating element in thermal contact with said temperature sensitive element whereby the resistance of said leg varies in accordance with the current through said auxiliary heating element, and means for feeding a current to said auxiliary heating element in proportion to the current flowing through said output electrodes whereby the output of said bridge circuit is indicative of the change in temperature of said material and the amount of heat being supplied to said material by said heating element.

5. In a servo system for automatically controlling the temperature of a material, a resistor element for heating said material, an A.-C. source, a rectifier, a signal translating transistor device having a control electrode and a pair of output electrodes for supplying current from said A.-C. source through said rectifier to said heating element for alternate half cycles of operation of said A.-C. source, a phase shift network responsive to a portion of said A.-C. source for providing a reference signal, said reference signal being out of phase with respect to said A.-C. source by a predetermined amount, a resistance bridge circuit having a temperature sensitive element in one leg for detecting minute changes in temperature of said material, the output of said bridge circuit being a signal whose polarity is indicative of the sense of temperature change and whose amplitude is indicative of the amount of temperature change, means for phase modulating said reference signal in accordance with said bridge output, and means coupling said phase modulated signal to said control electrode for controlling the supply of current through said output electrodes.

6. The combination recited in claim 5 wherein said coupling means comprise a limiter amplifier responsive to said phase modulated signal for generating a square wave signal, said square wave signal being out of phase with respect to said A.-C. source in accordance with the phase of said phase modulated signal.

7. In a servo system for automatically controlling the temperature of a material, a resistor element for heating said material, an A.-C. source, a rectifier, a signal translating transistor device having a control electrode and a pair of output electrodes for supplying current from said A.-C. source through said rectifier to said heating element for alternate half cycles of operation of said A.-C. source, a phase shift network responsive to said A.-C. source for providing a reference signal, said reference signal being of predetermined phase relationship with respect to said A.-C. source, a resistance bridge circuit having a temperature sensitive element in one leg for detecting minute changes in temperature of said material, the output of said bridge circuit being a signal whose polarity is indicative of the sense of said temperature changes and whose amplitude is proportional to the amount of temperature change, means for combining said bridge output signal and said reference signal to provide a control signal differing in phase with respect to the phase of said reference signal in proportion to the amplitude of said bridge output signal, and means for coupling said control signal to said control electrode to control the supply of current through said output electrodes.

8. The combination recited in claim 7 wherein said coupling means comprise means for amplifying said control signal, means responsive to said amplified control signal for producing a square wave signal, and means for connecting said square wave signal to said control electrode.

9. In a servo system for automatically controlling the temperature of a material, a resistor element for heating said material, an A.-C. source, a signal translating device for supplying current from said A.-C. source to said resistor element for a maximum period of a half cycle of each cycle of operation, means responsive to said A.-C. source for generating a reference signal shifted in phase with respect to said A.-C. source by a predetermined amount, means for detecting changes in temperature of said material, summing means for vector summing the detected changes in temperature with the phase shifted reference signal, and means responsive to the output of said summing means connected to said signal translating device for varying the length of the period during which current is supplied to said resistor.

References Cited in the file of this patent

UNITED STATES PATENTS

| | | |
|---|---|---|
| 2,553,060 | Miner | May 15, 1951 |
| 2,652,460 | Wallace | Sept. 15, 1953 |
| 2,729,396 | Impey et al. | Jan. 3, 1956 |
| 2,761,052 | Knudsen | Aug. 28, 1956 |
| 2,805,311 | Fluegel et al. | Sept. 3, 1957 |
| 2,957,111 | Schaeve et al. | Oct. 18, 1960 |
| 2,958,008 | Bray et al. | Oct. 25, 1960 |
| 2,975,260 | Carlson | Mar. 14, 1961 |

OTHER REFERENCES

Young and Bueche: "Fundamentals of Electronics and Control," Copyright 1952 (pages 217–224).